Oct. 27, 1959  A. GERBER  2,909,837
ARTICULATOR
Filed May 29, 1957

INVENTOR
Albert Gerber
BY: Michael S. Striker
Attorney

United States Patent Office 2,909,837
Patented Oct. 27, 1959

2,909,837

ARTICULATOR

Albert Gerber, Zurich, Switzerland

Application May 29, 1957, Serial No. 662,544

Claims priority, application Switzerland May 31, 1956

9 Claims. (Cl. 32—32)

My present invention relates to improvements in articulators comprising in combination a base plate movable both in a sagittal and in a transverse direction, and a fixed base plate including means for securing dentures thereto, two coaxial leading members having the form of bodies of rotation being connected to said movable base plate and each being movable in a radial elongated opening of an associated disc, and said discs being rotatable in props connected to said fixed base plate.

In a known articulator of this type, each leading member is capable to move in said elongated opening in a radial direction of the disc only and only up to the center of rotation of the disc. This was considered necessary lest said leading members change their positions upon rotation of the disc for varying the inclination of the track along which said members are movable. Said track, however, should rise again beyond this position of the leading members, substantially in accordance with a circular arc in adaptation to the form of the jawbone's joint socket. The articulator disclosed by my present invention satisfies both of these requirements, i.e. the leading members which are situated in the deepest portion of the elongated opening under the action of gravity, stand still upon partial rotation of the discs, and the track is extended in a circular arc beyond said deepest position of the leading members. The articulator of my present invention is characterized in that the elongated opening in each disc has, at its end adjacent the disc center, a wall portion which is concentric with the latter and of which the radius is greater than the smallest radius of the leading member disposed in the elongated opening.

An embodiment in which, as known per se, each leading member has substantially the form of two frustrums of which the small bases abut against each other, is characterized in that the slot wall is gabled in cross-section for the purpose of forming a knife-edge bearing, the latter being formed by two circular arcs and two tangential sections interconnecting said arcs, and the circular arc which is not concentric with the disc center having a radius equal to the smallest radius of the leading members. I thereby succeed in blocking a leading member in its axial direction when same has been brought to abut against the knife-edge section formed by the small circular arc, i.e. the movable base plate cannot move laterally any longer.

One form of my present invention is shown, by way of example, in the drawing, in which.

Figures 1, 2:
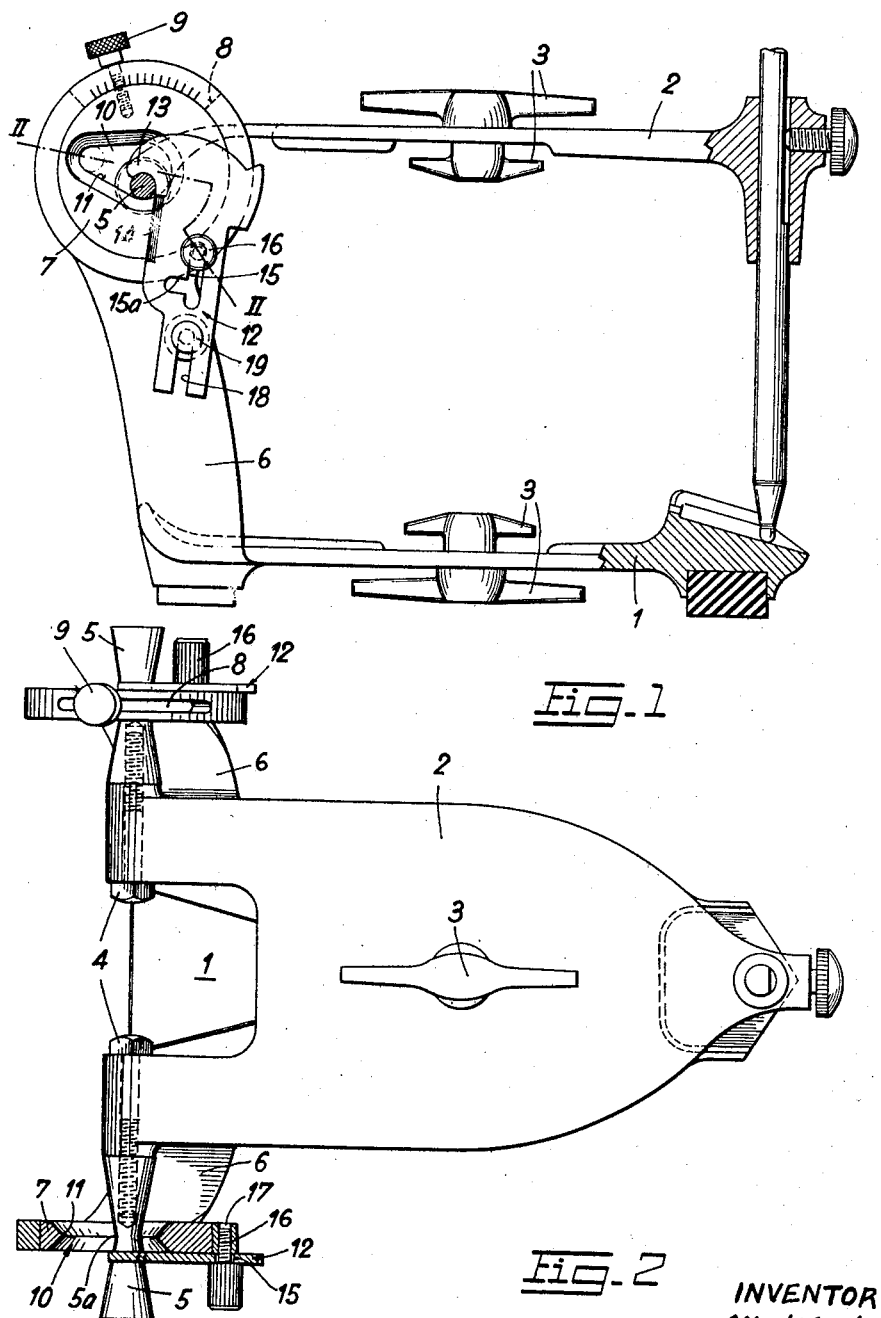
Fig. 1 shows the articulator in elevation, partly in section.
Fig. 2 is a plan view thereof, partly in section on the line II—II of Fig. 1.

The fixed base plate 1 and the movable base plate 2 comprise means 3 for securing dentures thereto. To the movable base plate is attached, in front and on both of its sides, a leading member 5 by a screw 4. Each of the two coaxial leading members has the shape of a body of rotation, i.e. the shape of two frustrums of which the small bases abut against each other, the transition 5a between the two frustrum surfaces suitably being slightly rounded.

The fixed base plate 1 comprises, in front and on both sides, a prop 6 which near its top is provided with a crossbore. The bores of the two props 6 are situated on a common horizontal axis, and in each bore is journaled a disc 7 which is provided with a radial threaded hole. In the latter is engaged a clamping screw 9 which projects through an elongated slot 8 of the respective prop 6 and which, at the same time, serves to prevent an axial movement of the disc and, when slackened, serves as handle for rotating the disc.

Each of the two discs 7 is provided with an elongated hole 10 of which the wall over its entire length is gabled in cross-section and, thus, forms a knife-edge bearing 11 for the respective leading member 5. Said knife-edge on the circumference of the elongated hole 10 is composed of two circular arcs and two tangential sections interconnecting the latter. One of said arcs is concentric with the center of rotation of disc 7 and has a radius which is approximately one-and-a-half times greater than the smallest radius of the leading member 5 at its transition 5a. The radius of the other arc is equal to the smallest radius of member 5.

When, therefore, the movable base plate 2 with its two leading members 5 bears on the deepest point of each of the two knife-edges 11 and subsequently the discs are rotated within the limits set by the length of the slots 8 for the purpose of varying the inclination of the lower straight knife-edge sections, the leading members do not change their positions, since the supporting knife-edge portion then is a portion of the circular arc which is concentric with the center of rotation of the disc. The movable base plate is capable to execute the following movements from this position of rest:

(a) Transverse movements, i.e. movements in the direction of the leading-member axis, the latter also being lifted on account of their twin-cone shape;

(b) Sagittal movements in which the leading members move along the knife-edges, these movements taking place either forwardly (to the left in Figs. 1 and 2) whereby the leading members move on the lower straight knife-edge sections (of which the inclination, as mentioned above, is variable between approximately 10 and 70°) or to the right whereby the leading members move on circular-arc sections of the knife-edges;

(c) Diagonal movements, with components according to (a) and (b); and (d) Pivoting or rotary movements in which one leading member is moved further forwardly or rearwardly than the other.

Aside of the position of rest, the leading members yet may assume another characteristic position, i.e. a position in which the leading members with their transitions 5a abut against that knife-edge portion which is formed by the small circular arc, and in which they are blocked against lateral transverse movement.

The articulator shown additionally comprises, adjacent to each disc 7, a locking piece 12 which at one end has a hook-like lug 13 and, immediately adjoining the latter, a straight guiding knife-edge or face 14. Locking piece 12 is provided with an elongated slot 15 with a lateral bay 15a, through which slot projects the smooth shank portion of a screw 16 which is engaged in a threaded hole 17 of prop 6 and which, when tightened, through its thicker knurled head clamps 12 against the prop. Locking piece 12 also is provided with a slot 18 which is open at the lower end and through which projects a pin 19 fixed to prop 6, said pin together with the slackened screw 16 serving as guide for the locking piece 12.

The locking piece 12 may be selectively clamped in any of three positions, namely:

(a) In the position shown in which the upper end of slot 15 bears on screw 16 and in which the lug 13 is holding down the leading member 5 cooperating with the respective disc 7 so that the latter through its thinnest portion bears on the deepest point of the knife-edge bearing 11 of the disc and is locked against movement in its longitudinal direction and transversely thereof; the radius of curvature of the lug underside therefore suitably is equal to the radius of that leading-member section against which said underside abuts in this operative position of the locking piece 12; in cross-section said underside conveniently is made convex;

(b) In a higher position in which the lower end of slot 15 abuts against screw 16 and in which the guiding knife-edge 14 of the locking piece at least partially balances the effect of that portion of the knife-edge bearing 11 of disc 7 which is concentric with the disc center; the farther knife-edge 14 is from the center of disc 7 or of the just-mentioned portion of knife-edge bearing 11, the farther may move the leading member on this portion of knife-edge bearing 11 to subsequently move along the knife-edge 14 of the locking piece to the right (Fig. 1) and upwardly for the purpose of imitating certain transversal movements;

(c) In any partially rotated position in which the end of slot bay 15a abuts against screw 16 and in which it does not execute the action mentioned either sub (a) or sub (b).

While I have described and illustrated one embodiment of my invention, I do not wish to limit the scope of the invention unnecessarily, but reserve the right to make such modifications and rearrangements of the several parts as may come within the purview of the accompanying claims.

What I claim is:

1. In a dental articulator in combination, a fixed base plate member; a movable base plate member; a supporting plate portion rotatable on one of said members having therein an elongated opening having a width decreasing from one end thereof toward the other end, the walls or said opening being of gabled cross-section for the purpose of forming a knife-edge bearing, said wall having two arcuate terminal sections and two substantially straight sections connecting said arcuate sections, said arcuate sections being of different radius of curvature, the arcuate wall section of larger radius of curvature being adjacent the center of said rotatable plate portion and concentric therewith; and a leading member mounted on the other of said plate members and having the form of a body of rotation with an elongated portion thereof having substantially the form of two conical frustrums joined at their smaller ends, said elongated portion of said leading member being located in said elongated opening of said supporting portion serving as hinge attachment of said base plate members to each other, the radii of curvature of said arcuate wall sections being respectively greater than and substantially equal to the least radius of said elongated portion of said leading member.

2. An articulator as set forth in claim 1, in which is disposed a locking piece adjacent to said supporting plate portion, said piece comprising at one end a hook-like lug and immediately adjoining thereto a straight guiding knife-edge or guiding face, and said piece being selectively clampable in each of three positions, namely in a first position in which said lug holds down the leading member coacting with said plate portion so that this member through its thinnest portion bears on the deepest point of the knife-edge bearing of said plate portion and is locked against movement in its longitudinal direction and in a direction transversely thereof, in a second and higher position in which the guiding knife-edge or guiding face of the locking piece at least partially balances the effect of that portion of the disc knife-edge bearing which is concentric to the disc center, and in a third position in which said piece does not execute either one or the other of said actions.

3. An articulator as set forth in claim 2, in which is provided a clamping screw for clamping the locking piece in any of said three positions, said screw being engaged in a threaded hole of said one base plate member and projecting through a slot of said piece and having an enlarged head which when the screw is tightened clamps said piece against said plate portion, and in which a guide pin secured to said one base member is engaged in an additional slot of said piece.

4. In a dental articulator in combination, a fixed base plate member; a movable base plate member; a supporting plate portion on one of said members having therein an elongated opening having a width decreasing from one end thereof toward the other end; and a leading member mounted on the other of said plate members and having the form of a body of rotation with an elongated portion thereof having a thickness increasing from one end thereof toward the other, said elongated portion of said leading member being located in said elongated opening of said supporting portion serving as hinge attachment of said base plate members to each other.

5. In a dental articulator in combination, a fixed base plate member; a movable base plate member; a supporting plate portion rotatable on one of said members having therein an elongated opening having a width decreasing from one end thereof toward the other end; and a leading member mounted on the other of said plate members and having the form of a body of rotation with an elongated portion thereof having a thickness increasing from one end thereof toward the other, said elongated portion of said leading member being located in said elongated opening of said supporting portion serving as hinge attachment of said base plate members to each other, the wider end of said opening being adjacent the center of said rotatable plate portion and having an arcuate wall section concentric therewith, a radius of said wall section being greater than the least radius of the portion of said leading member located in said opening.

6. In a dental articulator in combination, a fixed base plate member; a movable base plate member; a supporting plate portion on one of said members having therein an elongated opening having a width decreasing from one end thereof toward the other end; and a leading member mounted on the other of said plate members and having the form of a body of rotation with an elongated portion thereof having substantially the form of two conical frustrums joined at their smaller ends, said elongated portion of said leading member being located in said elongated opening of said supporting portion serving as hinge attachment of said base plate members to each other.

7. In a dental articulator in combination, a fixed base plate member; a movable base plate member; a supporting plate portion on one of said members having therein an elongated opening having a width decreasing from one end thereof toward the other end, the walls of said opening being of gabled cross-section for the purpose of forming a knife-edge bearing; and a leading member mounted on the other of said plate members and having the form of a body of rotation with an elongated portion thereof having a thickness increasing from one end thereof toward the other, said elongated portion of said leading member being located in said elongated opening of said supporting portion serving as hinge attachment of said base plate members to each other.

8. In a dental articulator in combination, a fixed base plate member; a movable base plate member; a supporting plate portion rotatable on one of said members having therein an elongated opening having a width decreasing from one end thereof toward the other end, the walls of said opening having two arcuate terminal sections and two substantially straight sections connecting said arcuate sections, said arcuate sections being of different radius of curvature; and a leading member mounted on the other of said plate members and having the form of a body of rotation with an elongated portion thereof having a thickness increasing from one end thereof toward the other, said elongated portion of said leading member being located in said elongated opening of said supporting portion serving as hinge attachment of said base plate members to each other.

9. In a dental articulator in combination, a fixed base plate member; a movable base plate member; a supporting plate portion rotatable on one of said members having therein an elongated opening having a width decreasing from one end thereof toward the other end, the walls of said opening having two arcuate terminal sections and two substantially straight sections connecting said arcuate sections, said arcuate sections being of different radius of curvature; and a leading member mounted on the other of said plate members and having the form of a body of rotation with an elongated portion thereof having a thickness increasing from one end thereof toward the other, said elongated portion of said leading member being located in said elongated opening of said supporting portion serving as hinge attachment of said base plate members to each other, the arcuate wall section of said opening having a larger radius of curvature being adjacent the center of said rotatable plate portion and concentric therewith, the radius of said wall section being greater than the least radius of the portion of said leading member located in said opening; and the arcuate wall section of said opening having a smaller radius of curvature having a radius substantially equal to the least radius of said portion of said leading member.

References Cited in the file of this patent

UNITED STATES PATENTS

| | | |
|---|---|---|
| 2,688,800 | Gerber | Sept. 14, 1954 |
| 2,797,483 | Lisowski | July 2, 1957 |